(12) United States Patent
Breitruck et al.

(10) Patent No.: US 12,467,849 B2
(45) Date of Patent: Nov. 11, 2025

(54) MEASUREMENT CUVETTE AND RADIATION SENSOR, WHICH CAN BE DETACHABLY CONNECTED ONLY IN A PREDEFINED RELATIVE ORIENTATION

(71) Applicant: HAMILTON MEDICAL AG, Bonaduz (CH)

(72) Inventors: Felix Breitruck, Buchs (CH); Jürg Roffler, Chur (CH); Marie-Kristin Schreiber, Chur (CH); Christoph Schranz, Fläsch (CH)

(73) Assignee: HAMILTON MEDICAL AG, Bonaduz (CH)

( * ) Notice: Subject to any disclaimer, the term of this patent is extended or adjusted under 35 U.S.C. 154(b) by 421 days.

(21) Appl. No.: 17/639,690

(22) PCT Filed: Sep. 8, 2020

(86) PCT No.: PCT/EP2020/075051
§ 371 (c)(1),
(2) Date: Mar. 2, 2022

(87) PCT Pub. No.: WO2021/048111
PCT Pub. Date: Mar. 18, 2021

(65) Prior Publication Data
US 2022/0291117 A1   Sep. 15, 2022

(30) Foreign Application Priority Data
Sep. 9, 2019 (DE) .......................... 102019124107.3

(51) Int. Cl.
*G01N 21/05* (2006.01)
*A61B 5/083* (2006.01)
(Continued)

(52) U.S. Cl.
CPC ........... *G01N 21/05* (2013.01); *A61B 5/0836* (2013.01); *A61M 16/0003* (2014.02);
(Continued)

(58) Field of Classification Search
CPC .............. G01N 21/05; G01N 21/3504; G01N 2021/6432; G01N 33/497; A61B 5/0836;
(Continued)

(56) References Cited

U.S. PATENT DOCUMENTS 5,067,492 A * 11/1991 Yelderman ........... A61B 5/0836
128/204.23
5,793,044 A * 8/1998 Mace .................. G01N 21/3504
250/343
(Continued)

FOREIGN PATENT DOCUMENTS

DE           69734401 T2    9/1998
WO            9607886 A1    3/1996
WO         2007103855 A2    9/2007

OTHER PUBLICATIONS

German PTO Search Report for DE 102019124107.3 dated May 4, 2020.
(Continued)

*Primary Examiner* — Jonathan M Hansen
(74) *Attorney, Agent, or Firm* — Tollefson IP

(57) ABSTRACT

A measurement cuvette for detecting at least one fluid constituent of a fluid flowing through the measurement cuvette by means of electromagnetic radiation, includes: a channel, which extends through the measurement cuvette along a channel path extending centrally through the channel; a coupling and detection portion, which extends, between its first longitudinal end and its second longitudinal end, along a linear longitudinal axis, detachably mechanically coupled to a radiation component; a physical orientation structure, which allows detachable mechanical coupling of the measurement cuvette to the radiation component in a predefined desired relative orientation and prevents the detachable mechanical coupling in an undesired relative orientation. The physical orientation structure is arranged and formed between the first and the second longitudinal ends of the coupling and detection portion.

19 Claims, 8 Drawing Sheets

Figure 1:
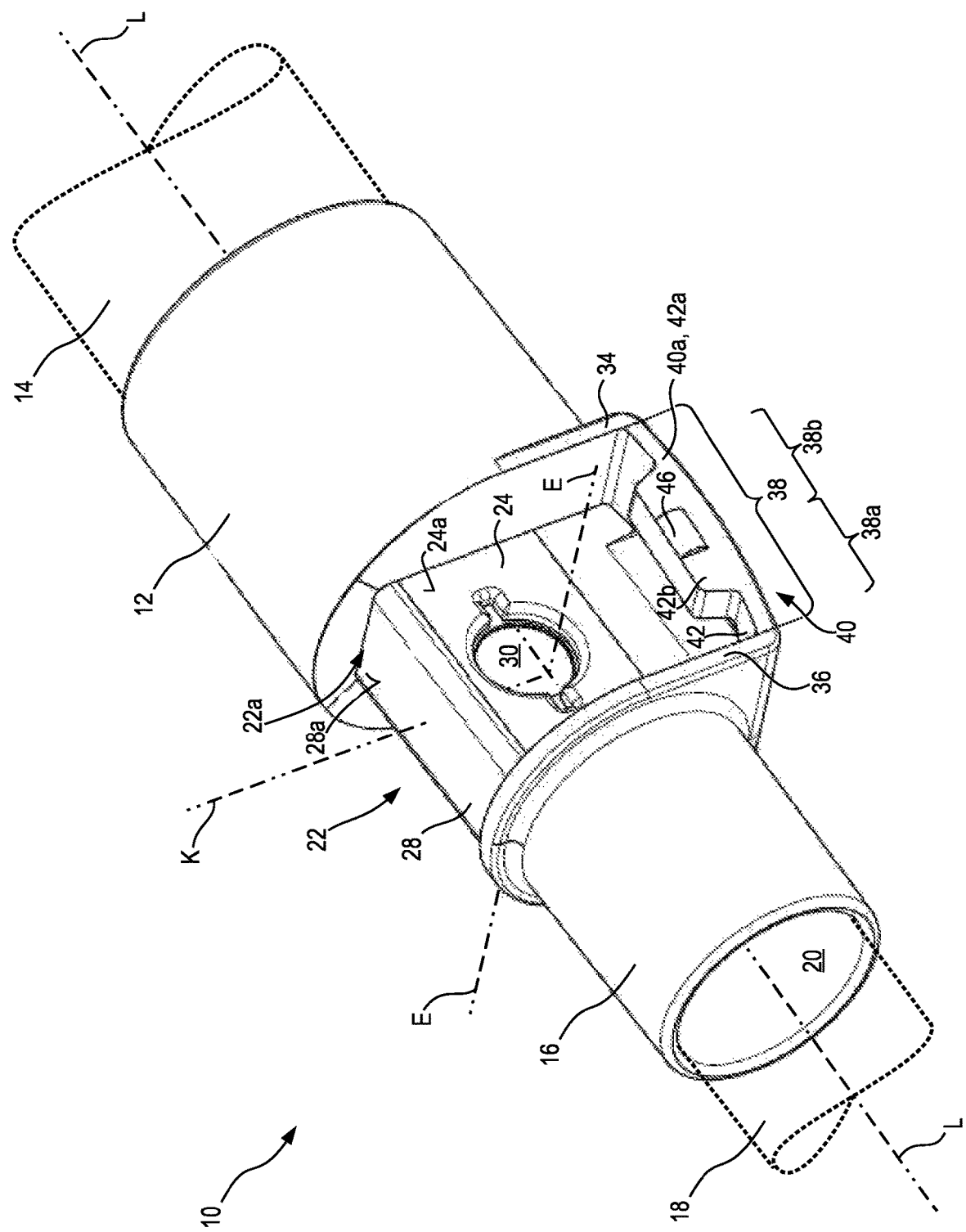

(51) Int. Cl.
*A61M 16/00* (2006.01)
*A61M 16/08* (2006.01)
*A61M 16/10* (2006.01)
*G01N 21/3504* (2014.01)

(52) U.S. Cl.
CPC ... *A61M 16/0816* (2013.01); *A61M 2016/103* (2013.01); *A61M 2230/432* (2013.01); *G01N 21/3504* (2013.01)

(58) Field of Classification Search
CPC ..... A61B 5/0071; A61B 5/0075; A61B 5/082; A61B 5/097; A61B 5/0873; A61M 16/0003; A61M 16/0816; A61M 2016/103; A61M 2230/432; A61M 2205/3313
See application file for complete search history.

(56) References Cited

U.S. PATENT DOCUMENTS

| | | | |
|---|---|---|---|
| 6,095,986 A | * | 8/2000 | Braig .................. A61B 5/097 D24/129 |
| 6,101,406 A | | 8/2000 | Hacker et al. |
| 2004/0013570 A1 | | 1/2004 | Labuda et al. |
| 2007/0103855 A1 | | 5/2007 | Hara et al. |
| 2007/0261698 A1 | | 11/2007 | Palatnik |
| 2008/0200825 A1 | | 8/2008 | Rich et al. |

OTHER PUBLICATIONS

International Search Report for PCT/EP2020/075051 dated Dec. 17, 2020.

* cited by examiner

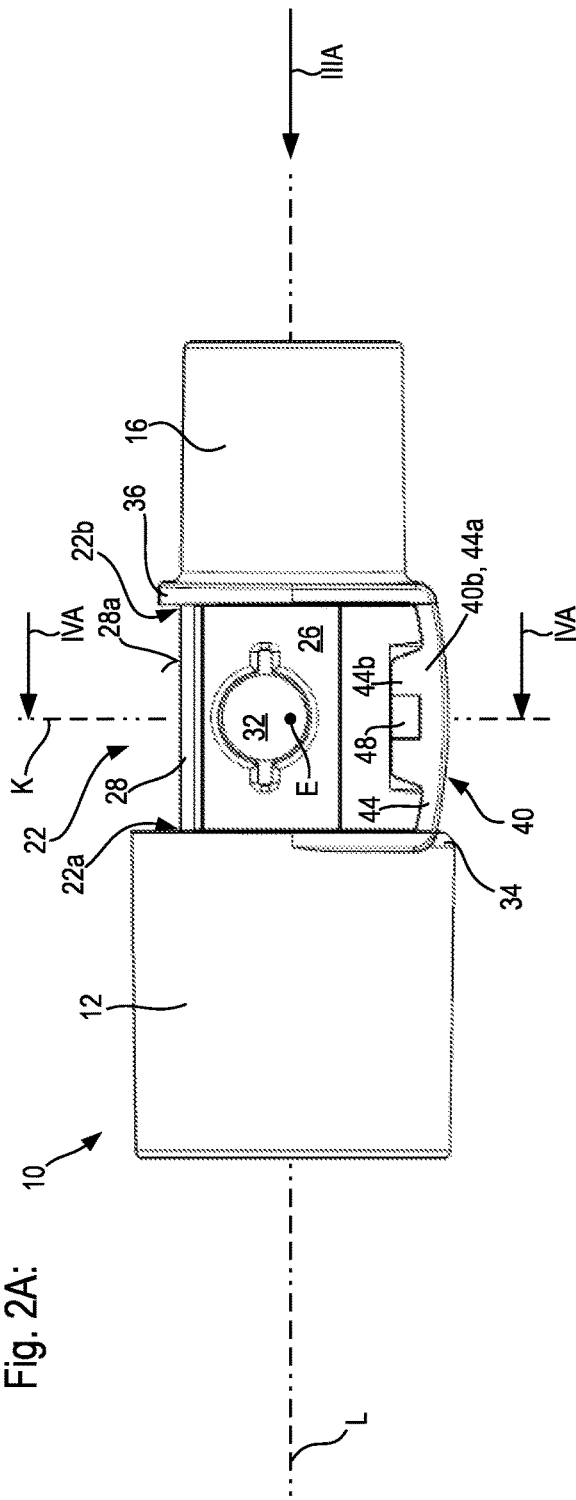
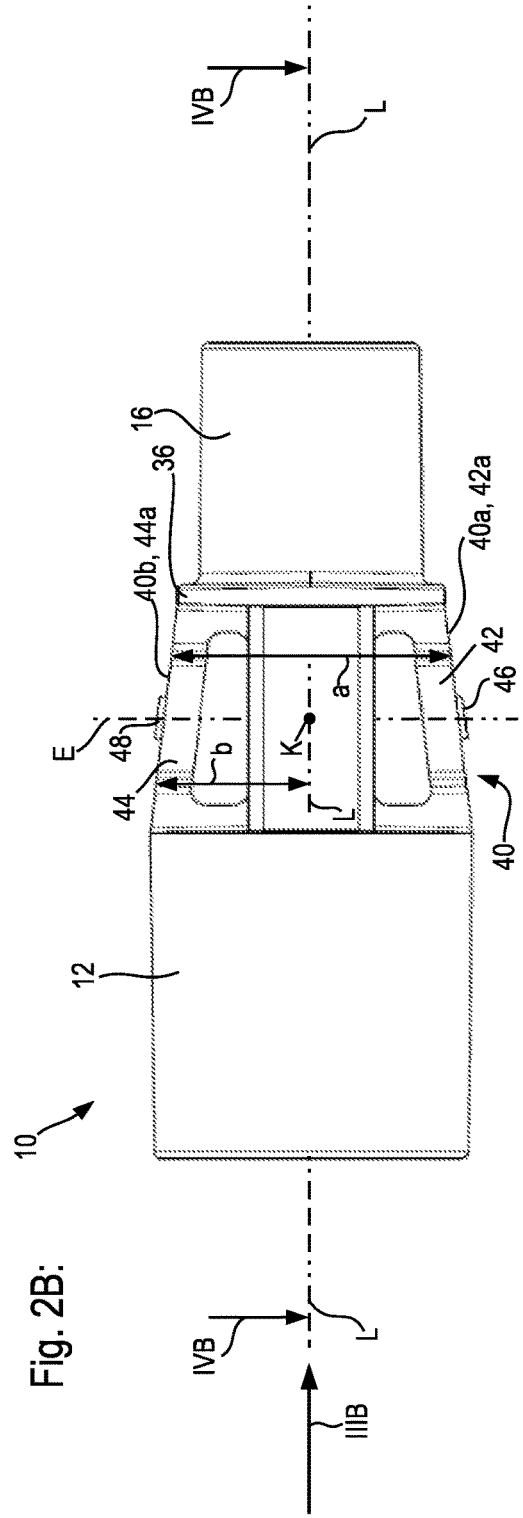
Fig. 2A:
Fig. 2B:

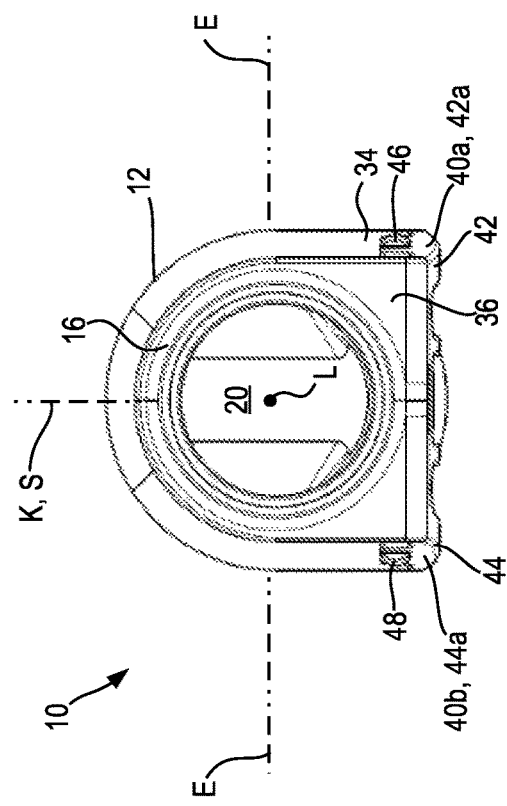

MEASUREMENT CUVETTE AND RADIATION SENSOR, WHICH CAN BE DETACHABLY CONNECTED ONLY IN A PREDEFINED RELATIVE ORIENTATION

CROSS-REFERENCE TO RELATED APPLICATIONS

This application is the National Stage of International Application No. PCT/EP2020/075051, filed on Sep. 8, 2020, which claims the benefit of German Application No. 10 2019 124 107.3, filed on Sep. 9, 2019. The entire contents of both applications are hereby incorporated herein by reference.

BACKGROUND OF THE INVENTION

The present invention concerns a measuring cuvette for detecting at least one fluid component of a fluid flowing through the measuring cuvette with the involvement of electromagnetic radiation, where the measuring cuvette comprises:
A duct penetrating through the measuring cuvette along a duct path, where the duct path is conceived as penetrating centrally through the duct,
A first connector formation for connecting a first fluid-conveying line to the measuring cuvette,
A second connector formation for connecting a second fluid-conveying line to the measuring cuvette,
A coupling and detection section between the first and the second connector formation, which
  Extends along a straight longitudinal axis between its first longitudinal end which is nearer to the first connector formation and its second longitudinal end which is nearer to the second connector formation,
  Is configured at least for radiating electromagnetic radiation into a duct region of the measuring cuvette surrounded by the detection section, and
  Is configured for detachable mechanical coupling with a radiation component, comprising a radiation source and/or a radiation sensor of the electromagnetic radiation,
Where the measuring cuvette exhibits a physical orientation structure which allows detachable mechanical coupling of the measuring cuvette with the radiation component in a predetermined desirable relative orientation and prevents it in an undesirable relative orientation.

The present invention further concerns a radiation component, configured for coupling with a measuring cuvette of the present application, where the radiation component surrounds on three sides an accommodating space in which the coupling and detection section of the measuring cuvette can be accommodated, where at least one section of the radiation component bounding the accommodating space is configured as transparent to electromagnetic radiation, such that the accommodating space is reachable for electromagnetic radiation emitted from a radiation source in the radiation component, where the accommodating space penetrates through the radiation component along a straight accommodation axis conceived as extending centrally through the accommodating space, where the radiation component exhibits a physical aligning structure which allows detachable mechanical coupling of the radiation component with the measuring cuvette in a predetermined desirable relative alignment and prevents it in an undesirable relative alignment.

The present invention likewise concerns a sensor assembly, which comprises a measuring cuvette of the present application and a radiation component of the present application.

A generic measuring cuvette and a generic radiation component and consequently a generic sensor assembly are known for example from WO 96/007886 A1. The generic measuring cuvette is shown there in FIGS. 12 and 13. The coupling and detection section of the known measuring cuvette is encompassed here by a U-shaped frame, where the coupling and detection section extends between the parallel legs of the U-shaped frame along the base of the U-shaped frame between these legs. The first and second connector formations extend from the parallel legs of the U-shaped frame in the shape of connecting pieces, namely each respectively on the side facing away from the coupling and detection section.

The U-shaped frame is formed by a U-shaped planar shell component, where the respective legs and the base of the shell component are essentially planar. The parallel planar legs of the U-shaped frame are configured with different shapes at their free longitudinal ends further away from the base. The radiation component cooperating with the measuring cuvette with which it is detachably couplable, exhibits at its two end faces relative to the straight accommodation axis recesses, which are likewise formed with different shapes complementary each to a shape of the legs of the U-shaped frame, such that the free longitudinal ends of the two legs, in accordance with the lock-and-key principle, fit respectively only into the recess assigned to them at an end face, not however into the respectively other recess at the other end face. Consequently the free longitudinal ends of the two parallel planar legs of the U-shaped frame form an orientation structure of the measuring cuvette. Likewise, the end-face recesses in the housing of the radiation component, which interact with the free longitudinal ends of the legs in a positive-locking manner, form an aligning structure of the radiation component. Both structures ensure that the measuring cuvette is couplable with the radiation component only in exactly one relative orientation and/or relative alignment respectively.

At their free longitudinal ends further away from the base, the legs of the U-shaped frame each exhibit a latching lug which through slotting of the leg is arranged in a springy manner along the projection direction of the latching lug. With these latching lugs, the measuring cuvette can be latched in an overridable manner with the radiation component in the operationally coupled state, such that the measuring cuvette and the radiation component are coupled with one another secure up to a certain degree against separation.

The terms "orientation" and "alignment" should be understood here as synonymous. Different terms are used merely in order to make clear the assignment one time to the measuring cuvette and another time to the radiation component.

Further measuring cuvettes and radiation components, which in the manner described above ensure an unmistakable relative orientation of the measuring cuvette relative to the radiation component, are known from WO 2007/103855 A2 and from US 2004/013570 A1. What was said above regarding WO 96/007886 A1 applies mutatis mutandis to these publications.

The drawback of these solutions is that the free longitudinal ends of the U-shaped frame are bendable with little force about a bending axis lying in their planar extension, such that without further measures the legs, due to their relatively low component stiffness, even when incorrectly oriented coupling of the measuring cuvette and radiation component is attempted, instead of preventing coupling at an undesirable orientation can permit the coupling through bending deformation despite undesirable and/or incorrect respectively orientation at least to the extent that the coupling and detection section is situated completely in the accommodating space. For the same reason of protruding freely, the individually formed free longitudinal ends of the U-shaped legs can break off, such that the measuring cuvette and/or the radiation component respectively can no longer provide any feedback about a desirable correct or undesirable incorrect orientation.

Finally, out of the components: measuring cuvette and radiation component, the radiation component is normally the component which is used several times, whereas the measuring cuvette constitutes a single-use component which is disposed of after one use. A measuring cuvette is, therefore, normally coupled with only one radiation component coupled, a radiation component in contrast with several measuring cuvettes. Since the relatively thin edges of the free longitudinal ends of the legs of the U-shaped frame of the measuring cuvette interact with flanks of the end-face recesses in the housing of the radiation component, and since furthermore the relative direction of movement of the measuring cuvette and radiation component for inserting the coupling and detection section into the accommodating space and/or, which comes to the same thing, for sliding the radiation component onto the coupling and detection section, extends in parallel to the planar extension of the two legs, high surface pressures occur under a specified joining force at the free longitudinal ends due to their small edge area. Because of these high surface pressures, at least the recess in the housing of the radiation component can be gradually deformed through repeated incorrect orientation of the coupling and radiation component and the measuring cuvette. Then the aligning structure of the radiation component would lose its aligning effect.

SUMMARY OF THE INVENTION

It is, therefore, the task of the present invention to offer a technical solution for ensuring correctly oriented coupling of the measuring cuvette and the radiation component with greater reliability than offered by the state of the art for a large number of coupling procedures.

This task is solved by the present invention according to a first aspect through a measuring cuvette of the type mentioned at the beginning, in which the physical orientation structure between the first and the second longitudinal ends of the coupling and detection section is arranged and configured with a distance to the longitudinal axis which varies along the longitudinal axis and/or with a dimension orthogonally to the longitudinal axis that varies along the longitudinal axis.

The longitudinal axis then coincides, if the duct path is configured as a straight duct axis, with the duct axis. If the duct path is curved inside the coupling and detection section, the duct axis can be a tangent to the curved duct path. Certainly, WO 96/007886 A1 shows that the duct path can be diverted repeatedly in the coupling and detection section. When the duct path is diverted in the coupling and detection section but the duct path directions at both longitudinal ends of the duct region of the coupling and detection section are parallel or collinear, as is the case for example in WO 96/007886 A1, normally the longitudinal axis is parallel and/or collinear respectively with the duct path directions at the longitudinal ends of the duct region.

In principle, the coupling and detection section couplable with the radiation component through relative movement along a coupling axis. The radiation component normally surrounds the coupling and detection section on three consecutive sides, such that instead of a fourth side an insertion aperture remains at the radiation component through which the measuring cuvette and/or its coupling and detection section respectively is insertable along the coupling axis into the accommodating space of the radiation component. If, instead of the measuring cuvette, one regards the radiation component as a moving component, the radiation component can be slid onto the coupling and detection section along the coupling axis, where the insertion aperture runs ahead in this sliding-on movement. The coupling axis, along which a relative coupling movement of the measuring cuvette and the radiation component extends for producing an operational state of the sensor assembly which comprises the measuring cuvette and the radiation component, can be easily seen in the measuring cuvette taken on its own as well as in the radiation component taken on its own.

The longitudinal axis is then preferably orthogonal to the coupling axis and extends along the global flow direction along which fluid can flow through the measuring cuvette between its first and its second longitudinal ends. A third axis orthogonal both to the longitudinal axis and to the coupling axis completes the longitudinal axis and the coupling axis in forming a Cartesian axes system. The third axis is normally the irradiation axis, along which electromagnetic radiation is emitted by the radiation component into the duct region in the coupling and detection section.

In the event of doubt, the longitudinal axis should be understood as penetrating centrally through the duct region, i.e. for instance as a track of area centers. The exact position of the longitudinal axis, however, is not of the essence. It suffices to determine the orientation of the longitudinal axis.

In the desired orientation relative to the radiation component, the orientation structure can approach the radiation component without collisions, whereas in an undesirable and/or incorrect orientation respectively the orientation structure collides with a component section of the radiation component before operational coupling of the measuring cuvette and radiation component is reached. The physical collision impairs further relative movement of the measuring cuvette and radiation component into an operational coupling state.

Through the invention's arrangement and/or configuration of the orientation structure, the orientation structure extends with its largest extension component along the longitudinal axis and thus preferably orthogonally to the coupling axis. The risk of the orientation structure being deformed or broken off by the joining force exerted when producing an operational state along the coupling axis is consequently eliminated or at least considerably decreased. The high surface pressures mentioned above in connection with the state of the art can be avoided in this configuration.

In state of the art settings, the coupling and detection section extends with all its component sections that interact physically with the radiation component parallel to the longitudinal axis, such that the coupling and detection section when seen on its own, in state of the art devices is couplable with the radiation component in more than one orientation, at least in two orientation rotated by 180° relative to the coupling axis. This symmetry of the coupling and detection section relative to the coupling axis is broken by the orientation structure described above. The coupling and detection section of the measuring cuvette of the present invention is not invariant as regards its external dimensions under 180° rotation about the coupling axis.

High surface pressures and associated deformations or even damage can be even more reliably avoided by having the orientation structure extend along the longitudinal axis over more than one third of the dimension of the coupling and detection section. The larger the dimension of the orientation structure along the longitudinal axis, the larger the component section of the measuring cuvette over which a joining force applied for coupling the measuring cuvette with the radiation component can be distributed. Therefore, the orientation structure preferably extends over more than two thirds of the dimension, especially preferably over the entire dimension of the coupling and detection section, or even beyond it. The orientation structure can, for a significant decrease in the mechanical stress acting on it during coupling, extend beyond both longitudinal ends of the coupling and detection section.

Normally the coupling and detection section is formed by a cuvette section with three walls following one another in the circumferential direction about the longitudinal axis and angled pairwise to each other, where the walls exhibit a U-shape in a sectional view in a sectional plane orthogonal to the longitudinal axis. From a base wall of the U-shape there projects at both end regions one side-wall each. In the operational state of the radiation component coupled with the measuring cuvette, preferably the radiation component abuts with touching contact at least on the outer faces facing away from the duct region of the side walls protruding from the base wall and arranged at a distance from one another.

In a preferred embodiment, at least the outer surface regions of the two side-walls projecting furthest away from the duct region are planar and parallel to one another and to the longitudinal axis, in order to facilitate play-free arrangement in the accommodating space of the radiation component. An axis orthogonal to the planar outer surface regions of the side-walls as an irradiation axis is then at the same time orthogonal to the longitudinal axis. The coupling axis is likewise parallel to the outer faces of the side-walls and orthogonal to the longitudinal axis—and inevitably also to the irradiation axis. Preferably, the outer surface of a base wall bridging the distance between the two side walls is likewise planar and orthogonal to the coupling axis.

In principle, the orientation structure can be formed by walls of the coupling and detection section enclosing the duct region. Since, however, for reasons of increased accuracy of the measurement signal obtained thereby, side-walls with constant wall thickness parallel to the longitudinal axis and to one another are preferable in order to avoid refraction or diffraction of the electromagnetic radiation entering the duct region and/or transmitted through the duct region respectively, the orientation structure is preferably arranged at a distance from the walls enclosing the duct region. It is, however, not precluded that when only a region of the coupling and detection section which is central relative to the longitudinal axis is configured as transparent to electromagnetic radiation of the radiation component, or the transparent property is utilized metrologically only in this central region, a region of the aforementioned side walls of the coupling and detection section surrounding the duct region which is adjacent to this transparent region with respect to the longitudinal axis forms the orientation structure or contributes to it. The orientation structure can then be formed by the outer face of the side-walls on one side or on both sides of the transparent region. For example, the outer face of at least one side-wall on one side or on both sides of the transparent region can be configured as at least sectionwise tilted or stepped about an axis parallel to the coupling axis, possibly also to the longitudinal axis.

It is fundamentally the case that the orientation structure can be configured in such a way that its distance to the longitudinal axis and/or the dimension orthogonal to the longitudinal axis varies continuously and/or stepwise. The advantage of a stepwise change lies in the smaller space required for it. The advantage of a continuous change lies in the easy recognizability of the desired orientation and in the larger region over which the effect of the joining force is distributed during joining with a radiation component.

In order to prevent undesirable bending or torsion moments on the orientation structure resulting from inadvertent incorrect orientation, due to a distance along the longitudinal axis between two sections at different distances to the longitudinal axis and/or with different dimensions orthogonally to the longitudinal axis respectively, it is preferable if the orientation structure exhibits at least two sections at different distances to the longitudinal axis and/or with different dimensions orthogonally to the longitudinal axis, where the sections follow one another without gaps along the longitudinal axis.

As already explained above, the coupling and detection section can exhibit two walls extending along the longitudinal axis, arranged at a distance from one another orthogonally to the longitudinal axis, which bound the duct region of the measuring cuvette. These walls can be the aforementioned side-walls. Preferably the walls are parallel to one another. For reasons of simple fabrication and of the smallest possible impact on the electromagnetic radiation passing through at least one side-wall, preferably both side-walls, both side-walls preferably exhibit a planar outer surface. Normally the side-walls exhibit through-apertures for the passage of electromagnetic radiation. These can be closed off with a material different from the rest of the side-wall sections which is transparent to the respective desired electromagnetic radiation.

To prevent the orientation structure interfering with the walls of the coupling and detection section directly bounding the duct region, the orientation structure preferably exhibits an edge section extending along the longitudinal axis and tilted relative to the longitudinal axis. The edge section preferably lies at a distance from walls which bound the duct region. This distance is a distance in a direction orthogonal to the longitudinal axis, since the orientation structure is arranged in the longitudinal axial region in which the coupling and detection section is situated. The distance is preferably also oriented orthogonally to the coupling axis.

Preferably an operator should already be able to recognize the desired correct orientation of the measuring cuvette relative to the radiation component before sliding the radiation component onto the coupling and detection section of the measuring cuvette. The more clearly the desired orientation is recognizable for an operator, the more easily this is done. The orientation structure of an advantageously developed measuring cuvette, which even under poor illumination or in the dark can be correctly oriented by touch, exhibits two edge sections extending in a common longitudinal region along the longitudinal axis, namely one each on each side of the duct region, where each of the two edge sections is tilted relative to the longitudinal axis, where preferably the distance of the two edge sections from one another as measured orthogonally to the longitudinal axis varies along the longitudinal axis, especially preferably varies continuously. For example, the two edge sections can be arranged so as to converge along the longitudinal axis.

The edge sections can be edge sections of a shell- or plate-shaped component section of the coupling and detection section. This shell- or plate-shaped component section can be planar and/or exhibit a curvature. The curvature can be curvature about a curvature axis parallel to the longitudinal axis and/or can be curvature about a curvature axis parallel to the irradiation axis. Preferably the duct region of the coupling and detection section lies completely on one side of the shell- or plate-shaped component section, such that after producing operational coupling with the radiation component the component section can complete an outer surface of the housing of the radiation component.

In order to secure the coupling between the measuring cuvette and the radiation component, once produced, the orientation structure can carry latching elements which are configured for locking with locking elements at the radiation component.

The latching elements can be a latching projection or a latching recess. The locking elements then exhibit the respective other shape out of latching projection and latching recess, such that in the combination of latching elements and locking elements a latching projection and a latching recess interact in a positive-locking manner so as to produce locking.

Preferably the latching elements are provided in the region of the at least one edge section, such that locking with the locking elements is securely producible only at a correct orientation. Thereby it is avoided that a latching element provided remotely from the orientation structure would attain a locking situation under an adequately applied joining force due to relative mobility which is configured as functionally necessary for producing a locking of latching elements and locking elements even though in this case under normal operation the orientation structure collides with a component section of the radiation component. The nearer the locking elements are configured to the orientation structure, in the present case preferably at the edge section, the less can intermediate and potentially deforming components and component sections cause fundamentally undesirable locking despite inappropriate orientation.

Preferably the duct region is situated on one side of the edge section and/or on one side of the shell- or plate-shaped component section exhibiting the edge section, respectively. Therefore preferably the latching elements also project relative to the at least one edge section from the at least one edge section towards the same side on which the duct region of the measuring cuvette which is bounded with the involvement of the two walls is situated.

Preferably the latching elements are provided as springy at the measuring cuvette, namely especially preferably springy along a protruding direction of a latching projection or along an indented direction of a latching recess, in order to facilitate for an operator the making and the releasing of a locking. Especially preferably, the latching element-carrying edge section itself is configured as a spring, for example by means of slotting a shell- or plate-shaped component section which exhibits the edge section. The slot preferably extends in parallel to the edge section, such that the edge section forms a leaf spring or beam spring clamped at both longitudinal ends.

According to a second aspect of the present invention, which content-wise is interactively related to the first one, the present invention also solves the aforementioned task through a radiation component of the type mentioned at the beginning, in which the physical aligning structure is arranged and configured at the radiation component in the extension region of the accommodating space at a distance to the accommodation axis which varies along the accommodation axis and/or with a dimension orthogonally to the accommodation axis which varies along the accommodation axis.

The radiation component is penetrated through by the accommodating space along the accommodation axis, i.e. the latter extends along the accommodation axis between two end faces of the housing of the radiation component. The accommodating space is surrounded on three sides, usually in a U-shape, by the radiation component. A fourth, open side forms an insertion aperture through which the coupling and detection section of the measuring cuvette can be inserted into the accommodating space. The coupling axis already described above is, therefore, preferably orthogonal to the accommodation axis also. In the operational state, the radiation component is arranged astride at the coupling and detection section, which surrounds it on three sides, where the radiation component preferably abuts with contact on two side walls of the coupling and detection section extending along the accommodation axis.

A third axis orthogonal to the coupling axis and to the accommodation axis at the radiation component is a radiation axis along which preferably electromagnetic radiation can radiate through the accommodating space. In the operationally coupled state, the accommodation axis and the longitudinal axis on the one hand and the radiation axis and the irradiation axis on the other coincide, i.e. they are parallel or collinear with one another.

The radiation component comprises a radiation source, which preferably is accommodated alongside the accommodating space in a compartment of the radiation component. The radiation component preferably comprises in addition a sensor which is sensitive to electromagnetic radiation and outputs an output signal which represents the electromagnetic radiation incident on the sensor, depending on the type of sensor, in terms of its phase shift relative to a reference radiation and/or its intensity. The sensor can be arranged in the same region of the radiation component as the radiation source, for instance when the sensor should detect reflected electromagnetic radiation, or for instance when the sensor should detect excited electromagnetic radiation different from the electromagnetic radiation source, as for example is the case for fluorescence spectroscopy detection methods.

If the radiation component is configured also or exclusively for the detection of a $CO_2$ fraction in a fluid, the radiation source preferably comprises or is an infrared radiation source. The radiation component is then preferably a non-dispersive infrared sensor. Additionally or alternatively, the radiation component can be a fluorescence spectroscopy sensor whose radiation source excites a luminophore in the coupling and detection section of the measuring cuvette to emit excitation radiation, which excitation radiation is extinguished again by a predetermined gas fraction of the fluid flowing through the measuring cuvette. In this way, oxygen for example can be detected and quantified in the fluid. A preferred application of the radiation component and of the measuring cuvette, therefore, is their deployment in a respiratory gas line of a respirator for at least partial artificial ventilation of human or animal patients. Preferably it is arranged in a section of the respiratory gas line through which both inspiratory and expiratory respiratory gas flows, such that with the radiation component at least one gas component is detectable both in the expiratory and in the inspiratory respiratory gas. This is advantageous first and foremost for the detection of $CO_2$ as a metabolic product, since in this way the metabolic capacity of the ventilated patient can be inferred from the comparison of the inspiratory and expiratory $CO_2$ content.

Since in the operationally coupled state of the measuring cuvette and radiation component the orientation structure in the coupling and detection section of the measuring cuvette interacts physically with the aligning structure of the radiation component through abutting engagement or positive locking engagement, preferably according to the lock-and-key principle in which a structure out of the orientation structure and aligning structure, preferably the aligning structure configured at the housing of the radiation component, defines at least one edge section of a recess into which the respective other structure, preferably the orientation structure, fits only at an appropriate predetermined desired orientation, what was said above regarding the orientation structure also applies mutatis mutandis to the aligning structure of the radiation component. In this process, it is first and foremost the longitudinal axis of the coupling and detection section of the measuring cuvette that has to be replaced by the accommodation axis of the accommodating space of the radiation component and also the irradiation axis by the radiation axis.

Thus for reasons of advantageous low mechanical stressing in the event of incorrect relative orientation between the measuring cuvette and the radiation component, it is preferable if the aligning structure extends along the accommodation axis over more than one third of the dimension, preferably over more than two thirds of the dimension, especially preferably over the entire dimension of the accommodating space. Like the orientation structure, the aligning structure too can even extend on one or on both sides beyond a longitudinal end of the accommodating space.

Preferably the orientation structure extends mainly along the longitudinal axis of the coupling and detection section, i.e. its quantitatively largest extension component in a spatial Cartesian coordinate system with component axes parallel to the longitudinal axis, parallel to the coupling axis, and parallel to the irradiation axis, is the component parallel to the longitudinal axis. The same applies essentially to the aligning structure, except that here instead of the longitudinal axis the accommodation axis and instead of the irradiation axis the radiation axis should be used.

The distance of the aligning structure to the accommodation axis and/or the dimension orthogonal to the accommodation axis can, as already explained above for the orientation structure, vary continuously and/or stepwise.

For the securest possible arrangeability of the measuring cuvette at the radiation component only in the predetermined desired orientation, the aligning structure can likewise exhibit at least two sections at different distances to the accommodation axis and/or with different dimensions orthogonally to the accommodation axis, where the sections follow one another without gaps along the accommodation axis.

An aligning structure large in area and therefore for an operator not only visible but also tactile, which makes possible correct alignment of the radiation component even in the dark or without looking, can be realized by having configured at a housing of the radiation component at least in the region of an insertion aperture which proceeds essentially in parallel to the accommodation axis and completely penetrates through the radiation component along the accommodation axis, a recess bordering the insertion aperture, where the aligning structure is configured at or in this recess.

Now the recess can in principle be configured according to considerations which do not necessarily play a part as regards the correct alignment of the radiation component relative to the measuring cuvette. To ensure arrangeability of the measuring cuvette relative to the radiation component in only one desired alignment and/or orientation, it suffices if the aligning structure comprises or is a flank bounding the recess. The height of the flank can be configured to be small compared with the overall dimension of the radiation component. It suffices if the flank exhibits a height of half a millimeter to 2 mm. The flank can besides be arranged tilted relative to the coupling axis, such that it acts as an insertion chamfer.

In order to accommodate the largest possible, and therefore easily and reliably discernible, orientation structure in the region of the coupling and detection section of the measuring cuvette in the recess at the housing of the radiation component, the aligning structure can comprise or be one flank each bordering the recess on both sides of the insertion aperture, where preferably the spacing of the flanks measured orthogonally to the accommodation axis varies along the accommodation axis, especially preferably varies continuously.

For a secure, preferably overridable, fixing of the measuring cuvette and radiation component to one another, the radiation component can exhibit locking elements for locking the measuring cuvette in the operational state. During operational coupling of the measuring cuvette and the radiation component, the locking elements of the radiation component preferably enter into positive-locking latching engagement with the latching elements at the orientation structure of the measuring cuvette.

Advantageously the locking elements can be arranged or configured in the at least one flank, such that they do not project over the rest of the housing of the radiation component and thus do not result in injuries or cause damage to the radiation component. The locking elements too, can exhibit a locking projection or a locking recess. Normally the locking elements and the latching elements will exhibit complementary formations for producing and detaching a latching engagement between these elements.

Finally, the present invention solves the aforementioned task also through a sensor assembly, comprising a measuring cuvette as described and developed above, and a radiation component as described and developed above. In the operational state, in which the measuring cuvette and the radiation component are coupled detachably with one another, in this sensor assembly the longitudinal axis and the accommodation axis are parallel or collinear to one another in a common spatial region. The orientation structure and the aligning structure are at least section-wise, preferably completely, in positive-locking or abutment engagement with one another.

Advantageously, a cuvette-side component section exhibiting the orientation structure and a radiation component-side component section exhibiting the aligning structure can form in the operationally coupled state a flush outer surface region of the sensor assembly at the abutment point of the orientation structure and aligning structure. This is of interest mainly when the housing of the radiation component exhibits the aforementioned recess, whose edging in the longitudinal extension region of the accommodating space along the accommodation axis at least section-wise, preferably completely, is formed by the aligning structure. Then the cuvette-side component section exhibiting the orientation structure can as it were fill the recess in the region of the accommodating space. In the operationally coupled state of the measuring cuvette and the radiation component, both components together form a body with an essentially smooth surface, from which at the front side and at the rear side of the radiation component and/or of the sensor assembly respectively there project only the connector formations of the measuring cuvette.

The recess with the aligning structure edging it at least section-wise is preferably configured at the underside of the radiation component, at which the aforementioned insertion aperture is also configured.

BRIEF DESCRIPTION OF THE DRAWING FIGURES

Figure 4A:
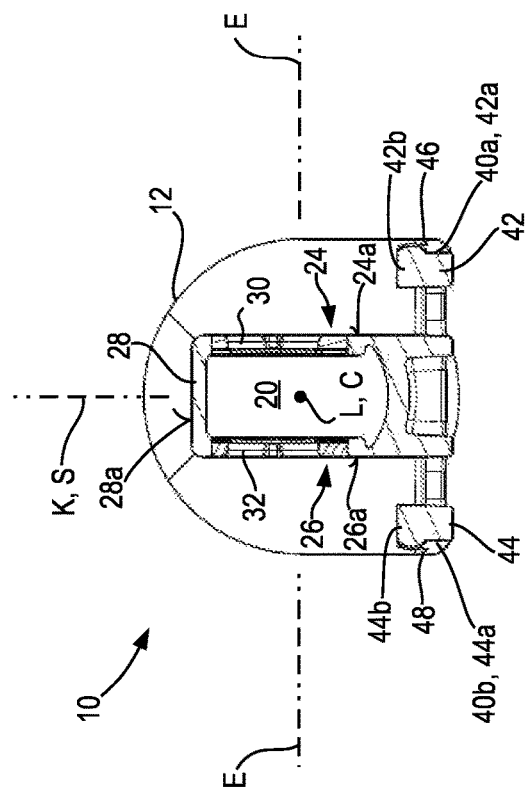
Figure 4B:
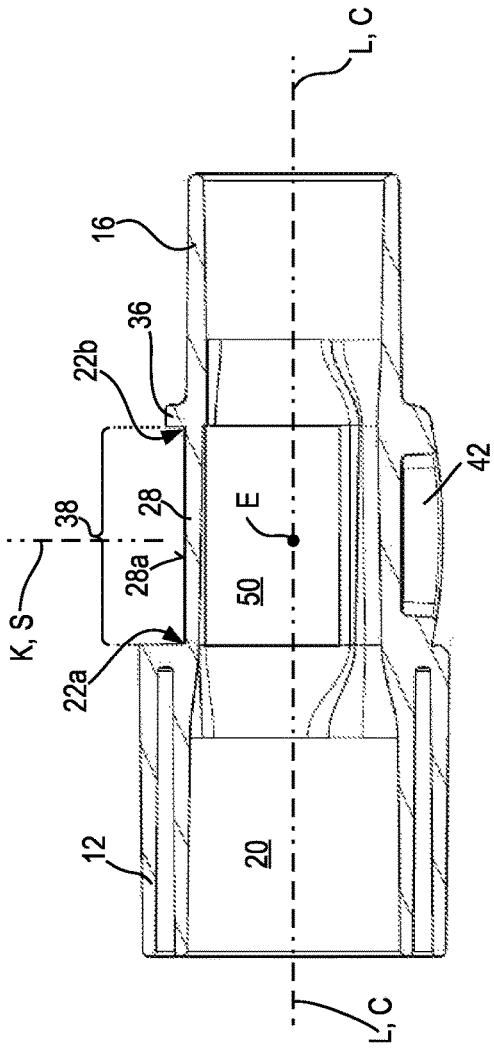
Figure 5:
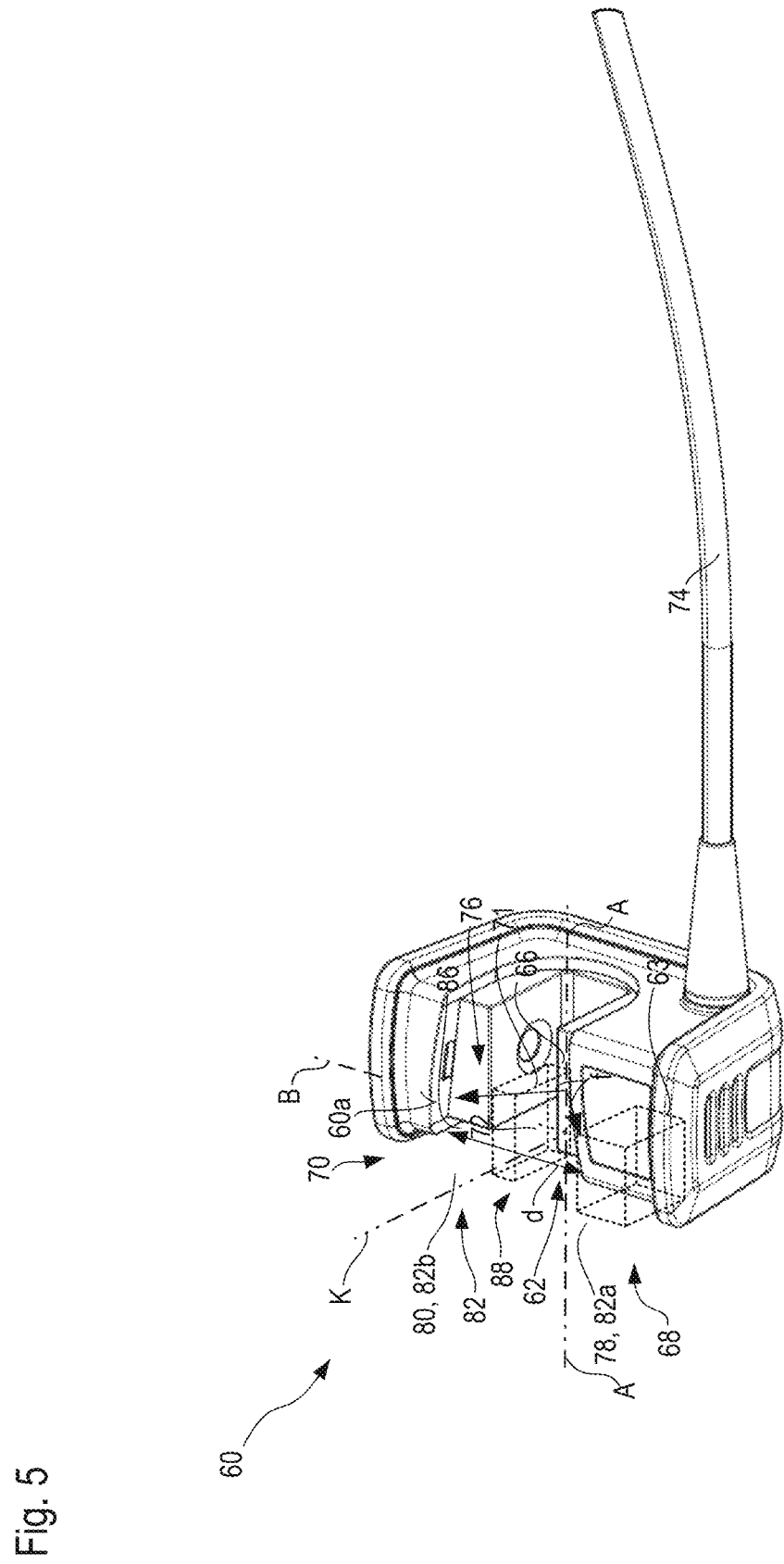
Figure 6:
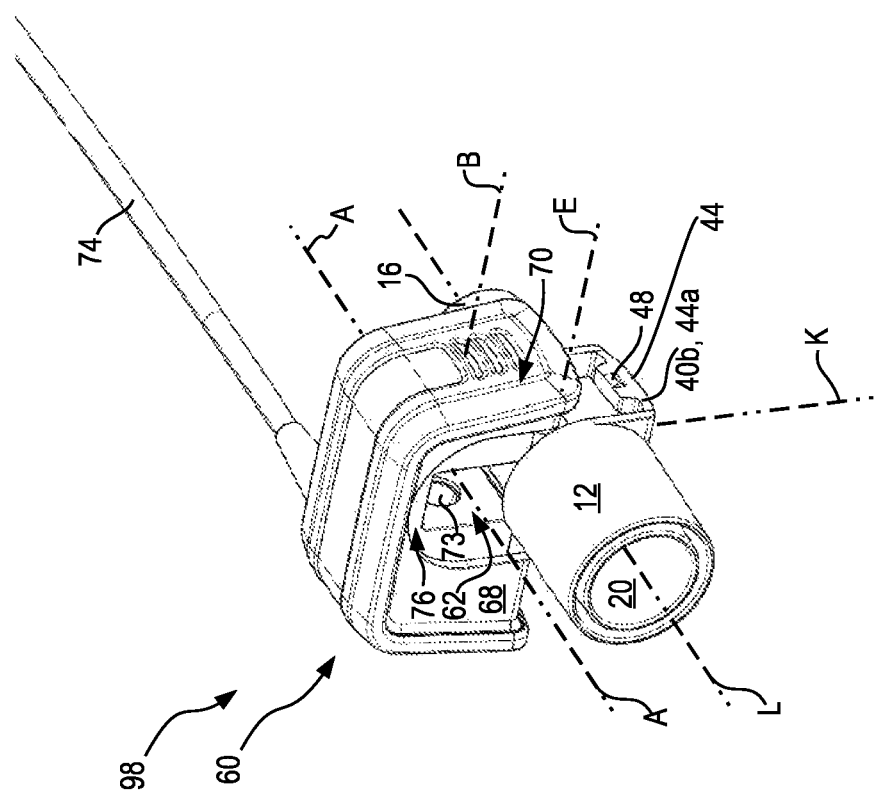
Figure 7:
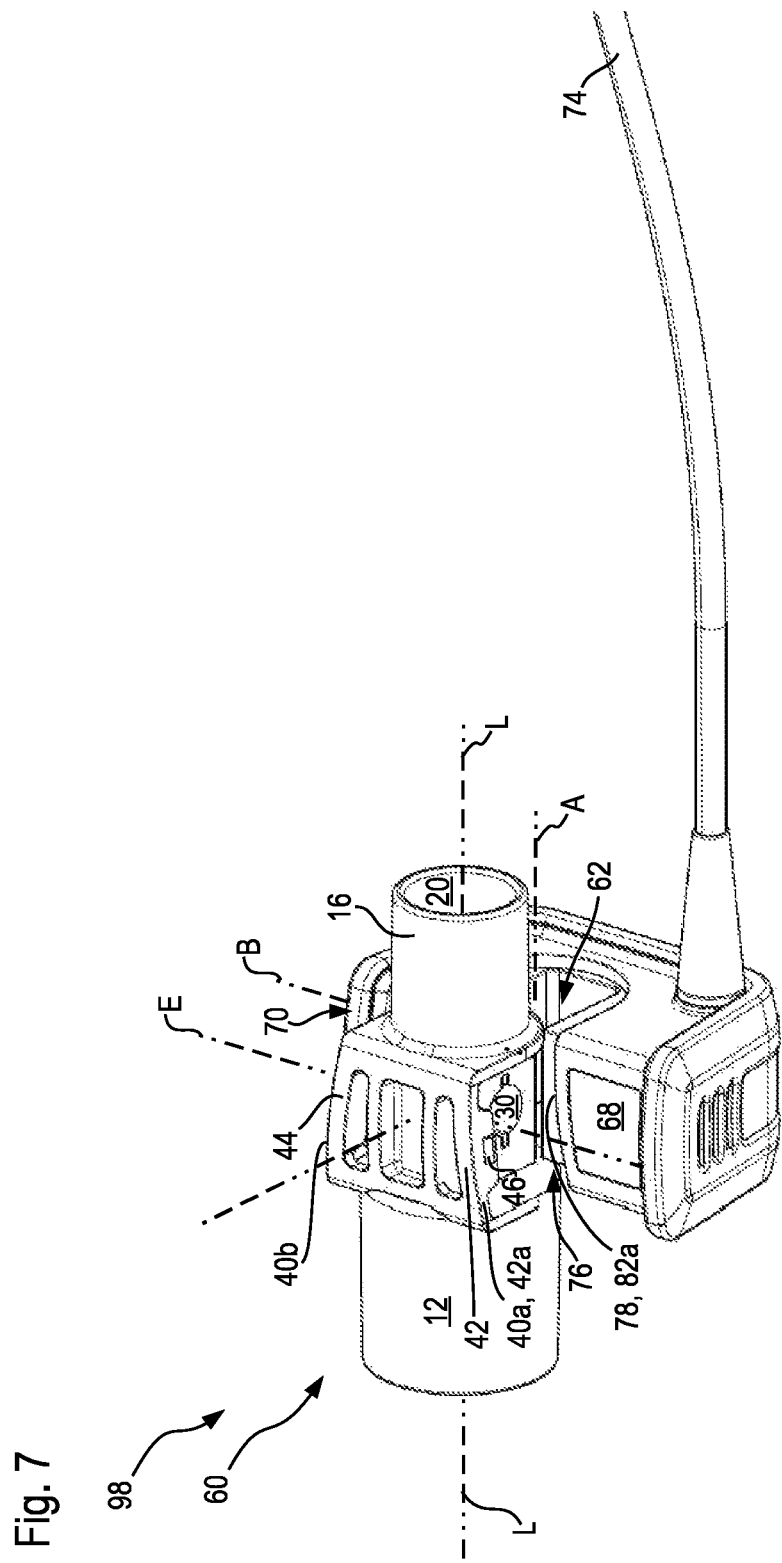
Figure 8:
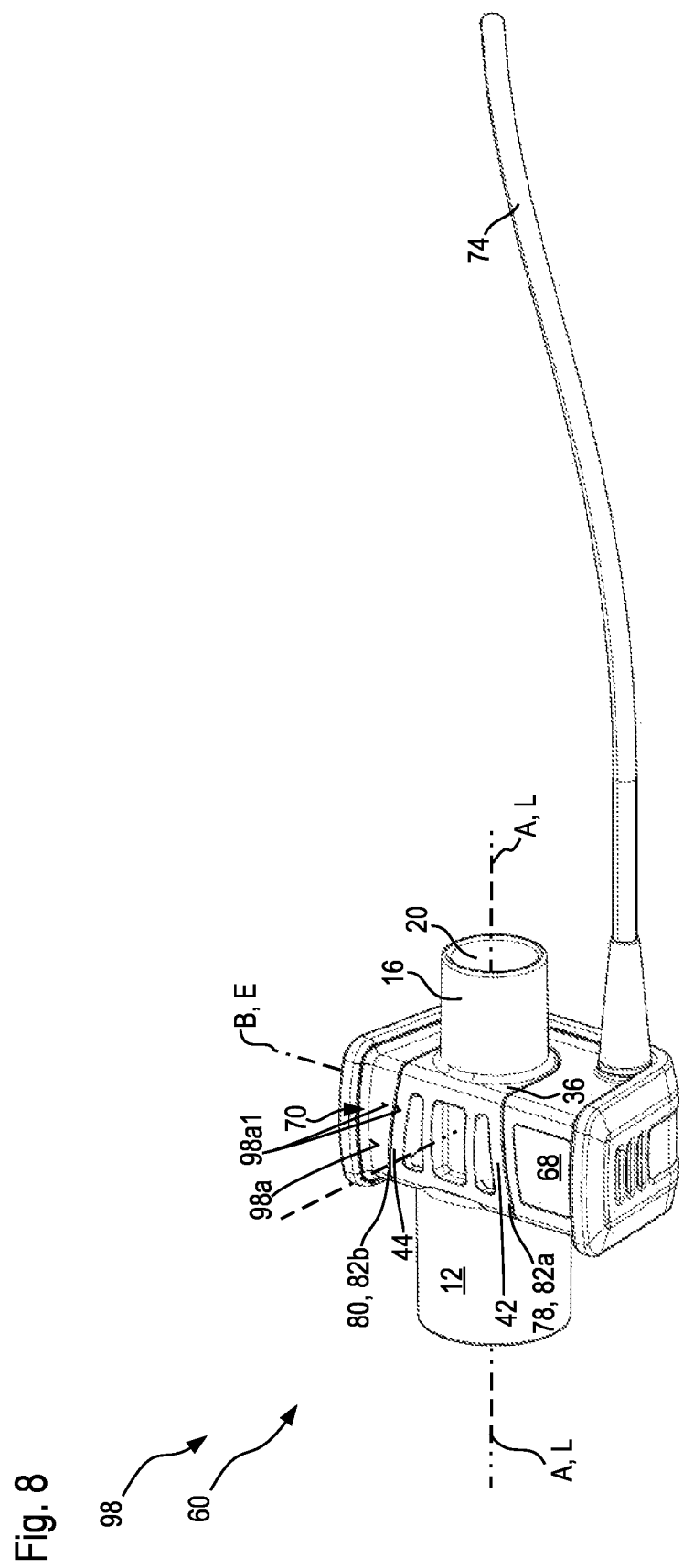

The present invention is elucidated hereinunder in more detail by reference to the attached drawings. The drawings depict:

FIG. 1 A rough schematic perspective view of an embodiment according to the invention of a measuring cuvette of the present application, FIG. 2A A rough schematic lateral elevation view of the measuring cuvette of FIG. 1, FIG. 2B A rough schematic top view of the measuring cuvette of FIG. 1, FIG. 3A A rough schematic axial view of the measuring cuvette of FIGS. 1, 2A, and 2B from the viewing direction of arrow IIIA of FIG. 2A, FIG. 3B A rough schematic axial view of the measuring cuvette of FIGS. 1, 2A, and 2B from the viewing direction of arrow IIIB of FIG. 2B, FIG. 4A A rough schematic sectional view of the measuring cuvette of FIGS. 1 to 3B along the sectional plane IVA-IVA of FIG. 2A, FIG. 4B A rough schematic sectional view of the measuring cuvette of FIGS. 1 to 4A along the sectional plane IVB-IVB of FIG. 2B, FIG. 5 A rough schematic perspective view of an embodiment of a radiation component according to the invention of the present application, FIG. 6 A rough schematic perspective view of a sensor assembly according to the invention of the present application, comprising the radiation component of FIG. 5 and the measuring cuvette of FIGS. 1 to 4B during a coupling procedure for coupling the measuring cuvette with the radiation component, FIG. 7 A further rough schematic perspective view of the sensor assembly of FIG. 6 during the coupling procedure from another viewing direction, and FIG. 8 A rough schematic perspective view of the sensor assembly of FIGS. 6 and 7 from the viewer position of FIGS. 5 and 7 after the end of the coupling procedure with operationally coupled components: radiation component and measuring cuvette.

DETAILED DESCRIPTION OF THE PREFERRED EMBODIMENTS

In FIGS. 1 to 4B, an embodiment of a measuring cuvette according to the invention of the present application is labeled generally by 10. It comprises at both its longitudinal ends a first connector formation 12 which is configured for connecting a first fluid line hose or pipe 14 indicated in FIG. 1 only by a dotted line, and a second connector formation 16 which is configured for connecting a second fluid line hose or pipe 18 indicated in FIG. 1 only by a dotted line. The connector formations 12 and 16 can be configured in a way that is known per se, for example as connecting pieces for plug connection, bayonet connection, or screw connection.

The measuring cuvette 10 depicted in FIG. 1, as an example, is configured for arrangement in a respiratory gas line of a respirator. The fluid line hoses 14 and 16 can therefore be respiratory gas line hoses.

In the depicted embodiment example, the first connector formation 12 exhibits a larger outer diameter than the second connector formation 16.

The entire measuring cuvette 10 extends in the longitudinal direction along a straight longitudinal axis L, along which the measuring cuvette 10 can have fluid flowing through it. The measuring cuvette 10 is therefore penetrated through along the longitudinal axis L by a duct 20, of which in FIG. 1 only its end region is discernible at the longitudinal end of the second connector formation 16.

Along the longitudinal axis L between the two connector formations 12 and 16 there is configured a coupling and detection section 22, which exhibits two side-walls 24 and 26 parallel to one another and to the longitudinal axis L and a base wall 28 connecting the two side-walls 24 and 26 with one another. The outer surfaces 24a, 26a, and 28a of the respective walls 24, 26, and 28 are at least section-wise planar, where the outer surface 28a of the base wall 28 is oriented orthogonally to the outer surfaces 24a and 26a of the side-walls 24 and 26 joined to the base wall 28. The base wall 28 and its outer surface 28a too, are preferably configured as planar and oriented in parallel to the longitudinal axis L.

Due to the configuration of the side-walls 24 and 26 as walls with planar outer surfaces 24a and 26a parallel to one another and furthermore due to the design of the connector formations 12 and 16 as conical or cylindrical formations with larger dimensions orthogonally to the longitudinal axis L than the coupling and detection section 22, the coupling and detection section 22 can be coupled in only one direction with the radiation component 60 shown in FIG. 5, namely along the coupling axis K shown in FIG. 1 which is orthogonal to the longitudinal axis L and parallel to the outer surfaces 24a and 26a.

It should be noted at this point that by way of departing from the above, the outer surfaces 24a and 26a can be configured at a distance from one another which decreases towards the base wall 28 so as to form an insertion chamfer, in order to facilitate insertion of the coupling and detection section 22 into the accommodating space 62 of the radiation component 60. In this case, the coupling axis K is still orthogonal to the longitudinal axis L and forms an angle bisector of the insertion chamfer angle enclosed by the outer surfaces 24a and 26a.

The side-walls 24 and 26 each exhibit a window 30 or 32 respectively penetrating though it in the thickness direction which is transparent to electromagnetic radiation, in the depicted example infrared radiation, from the radiation component 60. Consequently in the operationally coupled state of the measuring cuvette 10 and radiation component 60, the coupling and detection section 22 can have electromagnetic radiation transmitted through it in a way that is known per se through the windows 30 and 32 along an irradiation axis E which is orthogonal both to the longitudinal axis L and to the coupling axis K.

The first connector formation 12 terminates towards the coupling and detection section 22 in a lower region which in respect of the coupling axis is located remotely from the base wall 28 in a wall section 34 which is essentially orthogonal to the longitudinal axis L. The second connector formation 16 terminates towards the coupling and detection section 22 in a wall section 36 which is essentially orthogonal to the longitudinal axis L. The coupling and detection section 22 extends only between these wall sections 34 and 36 between its longitudinal ends 22a and 22b.

In the longitudinal extension section 38, in which the coupling and detection section 22 extends along the longitudinal axis L, there is situated an orientation structure 40 of the measuring cuvette 10, of which in FIG. 1 only a part-structure 40a is discernible.

The part-structure 40a, which is an edge section 42a of a bridge 42, exhibits in the coordinate system of the axes L, K, and E its greatest extension along the longitudinal axis L. As, however, is especially clearly discernible in FIG. 2B, the part-structure 40a is tilted relative to the longitudinal axis L, namely about a tilt axis parallel to the coupling axis K.

In FIG. 2B it is possible to discern the further part-structure 40b which complements the part-structure 40a to make the orientation structure 40, the former being configured relative to the part-structure 40a mirror-symmetrically in respect of a mirror symmetry plane S which contains the longitudinal axis L and the coupling axis K. The part-structure 40b too, is an edge section 44a of a bridge 44, which likewise is configured in respect of the mirror symmetry plane S mirror-symmetrically relative to the bridge 42.

Fundamentally, preferably the entire measuring cuvette 10, not only the orientation structure 40 depicted in the embodiment example, configured mirror-symmetrically in respect of the mirror symmetry plane S.

The orientation structure 40, formed by its described part-structures 40a and 40b, consequently exhibits a dimension a orthogonally to the longitudinal axis L which varies along the longitudinal axis L, in the depicted example over the entire longitudinal extension section 38 and even beyond it on both sides. There thus exist two sections 38a and 38b immediately consecutive along the longitudinal axis L, in which the distance a present between the part-structures 40a and 40b orthogonally to the longitudinal axis L is different. Because of the continuous tapering of the orientation structure 40 along the longitudinal axis L shown in the example, there really exist in the depicted example infinitely many such immediately consecutive sections. Instead of continuous tapering, however, the distance between the part-structures 40a and 40b could also vary stepwise, at least sectionwise. Then the number of immediately consecutive sections with different measurements orthogonally to the longitudinal axis L would be finite and preferably corresponded to the number of steps.

Because of the mirror-symmetrical configuration described above, the distance b between the longitudinal axis L, conceived as penetrating centrally through the duct 20, and each of the part-structures 40a and 40b also varies along the longitudinal axis L. Consequently, due to the distance b varying along the longitudinal axis L, each one of the bridges 42 or 44 could also be an orientation structure, although the measurement of the bridge 42 and the bridge 44 orthogonally to the longitudinal axis L does not change along the longitudinal axis L in the depicted example. The distance b is preferably orthogonal both to the longitudinal axis L and to the coupling axis K.

At each of the bridges 42 and 44 there is configured one tongue 42b or 44b respectively projecting in the direction of the coupling axis K towards the same side on which relative to the bridges 42 and 44 the duct 20 is also located completely in the coupling and detection section 22. At these tongues 42b and 44b there is configured a latching lug 46 or 48 respectively protruding along the irradiation axis E, which are configured for overridable locking of the measuring cuvette 10 at the radiation component 60 in the operationally coupled state.

FIG. 4B shows a duct region 50 surrounded by the coupling and detection section 22. This is the region of the duct 22 which lies in the longitudinal extension region 38 of the coupling and detection section 22. Despite the variations in the cross-sectional shape and area, the longitudinal axis L is also a virtual duct path C penetrating centrally through the duct 20.

FIG. 5 shows in rough schematic perspective bottom view the radiation component 60 to be coupled with the measuring cuvette 10. An accommodating space 62 completely penetrates through the radiation component 60 along an accommodation axis A. The radiation component 60 surrounds the accommodating space 62 on three sides. The accommodating space 62 is configured in such a way that the coupling and detection section 22 of the measuring cuvette 10 has room inside it, where during operational coupling of the radiation component 60 with the measuring cuvette 10, the side-walls 64 and 66 of the accommodating space 62 which are parallel to the accommodation axis A and to one another are in touching contact with the side walls 24 and/or 26 respectively of the coupling and detection section 22.

The coupling axis K, which is identical for the radiation component 60 and the measuring cuvette 10, extends orthogonally to the accommodation axis A in the depth direction of the accommodating space 62. The radiation axis B, along which both the accommodating space 62 and also—in the event of the operational coupling of the radiation component 60 with the measuring cuvette 10—the duct region 50 of the measuring cuvette 10 can have electromagnetic radiation, preferably infrared radiation, transmitted through them, extends orthogonally both to the accommodation axis A and to the coupling axis K.

In the larger compartment 68 on one side of the accommodating space 62 there is accommodated a radiation source 63 which is indicated only in FIG. 5 by a dotted line. In the smaller compartment 70 located on the other wise of the accommodating space 62 opposite the larger compartment 68 there is situated a sensor device 71, indicated only in FIG. 5 by a dotted line, which detects the electromagnetic radiation emitted by the radiation source after passing through the accommodating space 62 and/or through the duct region 50 respectively. In FIG. 5 there is discernible a measurement window 72, through which electromagnetic radiation can reach the sensor device in the compartment 70. In FIG. 6 there is discernible a radiation window 73, through which the electromagnetic radiation emitted from the radiation source enters the accommodating space 62.

Through a cable 74, control commands can be transmitted to the radiation component 60 and detection signals from the latter to a higher-level control unit and/or to an evaluation unit.

Between the accommodating space 62 and the outer surface 60a of the radiation component 60 there is configured a recess 76, which is configured at the two in respect of the accommodation axis A end-face regions of the radiation component 60 for the most play-free accommodation possible of the wall section 36 on the one side and of the first connector formation 12 and the wall section 34 on the other side.

In the extension region of the accommodating space 62, the recess 76 is bounded on both sides of the accommodating space 62 by a flank 78 and 80 each. Each of these flanks 78 and 80 forms a part-structure 82a or 82b respectively of an aligning structure 82, which due to its configuration is suitable and intended for allowing operational coupling of the measuring cuvette 10 with its orientation structure 40 with the radiation component 60 only in exactly one desired relative orientation.

Each of the part-structures 82a and 82b extends mainly, i.e. with its largest extension component in the Cartesian coordinate system of the axes K, A, and B, along the accommodation axis A, but is titled relative to the accommodation axis A, preferably at least about a tilt axis parallel to the coupling axis K. Thus, as the edge sections 42a and 44a which form the orientation structure 40 of the measuring cuvette 10 are essentially planar edge sections, the flanks 78 and 80 are also essentially planar flanks. The flank 78 abuts in the operationally coupled state of the measuring cuvette 10 and the radiation component 60 in a planar manner on the edge section 42a. The flank 80 on the edge section 44a. Each flank 78 and 80 exhibits one latching recess as a locking element, where in FIG. 5 only the latching recess 86 of the flank 80 is visible. In the operationally coupled state of the sensor assembly 98 consisting of measuring cuvette 10 and radiation component 60, the latching lug 46 of the measuring cuvette 10 engages in the latching recess of the flank 78 and the latching lug 48 of the measuring cuvette 10 engages in the latching recess 86 of the flank 80 with positive locking to produce an overridable latching engagement.

The aligning structure 82 tapers continuously along the accommodation axis A, i.e. the distance d between the flanks 78 and 80 which are opposite one another across the accommodating space 62 becomes continuously smaller or greater respectively along the accommodation axis A, depending on the direction in which one traverses the accommodation axis A. Likewise, the distance f of each flank 78 and 80 to the accommodation axis A varies continuously along the accommodation axis A.

Therefore, each of the flanks 78 and 80 taken for itself could also be an aligning structure. Because of the mirror-symmetrical configuration chosen in the example of the measuring cuvette 10 and/or of its coupling and detection section 22 respectively, the two distances f of the flanks 78 and 80 to the accommodation axis A are quantitatively equal in size at each point along the accommodation axis A. This, however, does not have to be the case.

The accommodating space 62 is open orthogonally to the accommodation axis A only in a direction along the coupling axis K. There is situated the insertion aperture 88, through which the coupling and detection section 22 of the measuring cuvette 10 is insertable into the accommodating space 62. The coupling and detection section 22 can also be withdrawn again from the accommodating space 62 through the insertion aperture 88.

FIG. 6 shows a state of the sensor assembly 98 in which the coupling and detection section 22 of the measuring cuvette 10 is being inserted in a coupling procedure through the insertion aperture 88 into the accommodating space 62 along the coupling axis K, however is not yet operationally inserted and coupled. The coupling axis K of the measuring cuvette 10 and of the radiation component 60 are collinear. The accommodation axis A and the longitudinal axis L are parallel to one another, however arranged at a distance from one another. Likewise, the radiation axis B and the irradiation axis E are parallel, however arranged at a distance from one another.

FIG. 7 depicts the state of the sensor assembly 98 of FIG. 6 in a rough schematic bottom view. In FIG. 7 it is most clearly discernible how the structures configured as complementary to one another: the orientation structure 40 and the aligning structure 82, allow operational coupling of the measuring cuvette 10 and the radiation components 60 only in exactly one desirable relative orientation.

FIG. 8 depicts from an identical viewing direction as in FIG. 7 the operationally coupled state of the measuring cuvette 10 and the radiation component 60. It can be discerned how the outer faces of the bridges 42 and 44 of the measuring cuvette 10, which also form the orientation structure 40, in the operationally coupled state form with the radiation component 60 across the joint line between the orientation structure 40 and the aligning structure 82 a flush region 98a1 of the outer surface 98a of the sensor assembly 98.

The invention claimed is:

1. A measuring cuvette for detecting at least one fluid component of a fluid flowing through the measuring cuvette with the involvement of electromagnetic radiation, the measuring cuvette comprising:
   a duct penetrating through the measuring cuvette along a duct path, where the duct path is conceived as penetrating through the duct centrally,
   a first connector formation for connecting a first fluid-conveying line,
   a second connector formation for connecting a second fluid-conveying line, and
   a coupling and detection section between the first and the second connector formation, which
   extends along a straight longitudinal axis between its first longitudinal end which is nearer to the first connector formation and its second longitudinal end which is nearer to the second connector formation,
   is configured at least for irradiation of electromagnetic radiation into a duct region of the measuring cuvette surrounded by the coupling and detection section, and
   is configured for detachable mechanical coupling with a radiation component, comprising a radiation source and/or a radiation sensor of the electromagnetic radiation,
   where the measuring cuvette exhibits a physical orientation structure which allows detachable mechanical coupling of the measuring cuvette with the radiation component in a predetermined desirable relative orientation and prevents it in an undesirable relative orientation,
   wherein the physical orientation structure is arranged and configured between the first and the second longitudinal end of the coupling and detection section at a distance to the longitudinal axis which varies, at least one of, along the longitudinal axis and with a dimension orthogonal to the longitudinal axis which varies along the longitudinal axis;
   wherein the orientation structure extends along the longitudinal axis over more than one third of the dimension.

2. The measuring cuvette according to claim 1, wherein the orientation structure extends along the longitudinal axis over more than two thirds of the dimension.

3. The measuring cuvette according to claim 1, wherein at least one of the distance to the longitudinal axis and the dimension orthogonal to the longitudinal axis, varies at least one of continuously and stepwise.

4. The measuring cuvette according to claim 1, wherein the orientation structure exhibits at least two sections with at least one of, different distances to the longitudinal axis and different dimensions orthogonally to the longitudinal axis, where the sections follow one another without gaps along the longitudinal axis.

5. The measuring cuvette according to claim 1,
wherein the coupling and detection section exhibits two walls extending along the longitudinal axis, arranged orthogonally to the longitudinal axis at a distance from one another, which bound the duct region of the measuring cuvett, where the orientation structure exhibits an edge section extending along the longitudinal axis which is tilted relative to the longitudinal axis.

6. The measuring cuvette according to claim 5,
wherein the orientation structure exhibits two edge sections in a common longitudinal region extending along the longitudinal axis, one each on each side of the duct region, where each of the two edge sections is tilted relative to the longitudinal axis, where the distance of the two edge sections from one another measured orthogonally to the longitudinal axis varies along the longitudinal axis.

7. The measuring cuvette according to claim 1,
wherein the orientation structure carries latching elements which are configured for latching with locking elements on the radiation component.

8. The measuring cuvette according to claim 5,
wherein the coupling and detection section exhibits two walls extending along the longitudinal axis, arranged orthogonally to the longitudinal axis at a distance from one another, which bound the duct region of the measuring cuvette, where the orientation structure exhibits an edge section extending along the longitudinal axis which is tilted relative to the longitudinal axis;
wherein the latching elements are projecting relative to the at least one edge section from the at least one edge section towards the same side on which the duct region of the measuring cuvette which is bounded with the involvement of the two walls is situated.

9. A radiation component, configured for coupling with a measuring cuvette according to claim 1, where the radiation component surrounds on three sides an accommodating space in which the coupling and detection section of the measuring cuvette can be accommodated, where at least one section of the radiation component which bounds the accommodating space is configured as transparent to electromagnetic radiation such that the accommodating space is reachable for electromagnetic radiation emitted from a radiation source in the radiation component, where the accommodating space penetrates through the radiation component along a straight accommodation axis conceived as extending centrally through the accommodating space, where the radiation component exhibits a physical aligning structure which allows detachable mechanical coupling of the radiation component with the measuring cuvette in a predetermined desirable relative alignment and prevents it in an undesirable relative alignment,
wherein the physical aligning structure is arranged and configured at the radiation component in the extension region of the accommodating space at a distance to the accommodation axis which varies, at least one of, along the accommodation axis and with a dimension orthogonally to the accommodation axis which varies along the accommodation axis;
wherein the aligning structure extends along the accommodation axis over more than a third of the dimension.

10. The radiation component according to claim 9,
wherein the aligning structure extends along the accommodation axis over more than two thirds of the dimension.

11. The radiation component according to claim 9,
wherein at least one of the distance to the accommodation axis and the dimension (d) orthogonal to the accommodation axis, changes at least one of continuously and stepwise.

12. The radiation component according to claim 9,
wherein the aligning structure exhibits at least two sections, at least one of, at different distances to the accommodation axis and with different dimensions orthogonally to the accommodation axis, where the sections follow one another without gaps along the accommodation axis.

13. The radiation component according to claim 9,
wherein at a housing of the radiation component at least in the region of an insertion aperture extending essentially in parallel to the accommodation axis, penetrating completely through the radiation component there is configured a recess bordering the insertion aperture, where the aligning structure is configured at or in the recess.

14. The radiation component according to claim 13,
wherein the aligning structure comprises or is a flank bounding the recess.

15. The radiation component according to claim 14,
wherein the aligning structure comprises or is one flank each bordering the recess on both sides of the insertion aperture, where the spacing of the flanks measured orthogonally to the accommodation axis varies along the accommodation axis.

16. The radiation component according to claim 9,
wherein the radiation component exhibits locking elements for locking the measuring cuvette in the operational state.

17. The radiation component according to claim 9,
wherein the aligning structure comprises or is a flank bounding the recess;
wherein the radiation component exhibits locking elements for locking the measuring cuvette in the operational state;
wherein the locking elements are arranged or configured in the at least one flank.

18. A sensor assembly, comprising a measuring cuvette and a radiation component according to claim 9, where in the operational state, in which the measuring cuvette and the radiation component are coupled detachably with one another, the longitudinal axis and the accommodation axis are parallel or collinear with one another in a common spatial region, where the orientation structure and the aligning structure are at least section-wise, in positive-locking or abutment engagement with one another.

19. The sensor assembly according to claim 18, wherein in the operational state a cuvette-side component section exhibiting the orientation structure and a radiation component-side component section exhibiting the aligning structure form at the abutment point of the orientation structure and the aligning structure a flush outer surface region of the sensor assembly.

* * * * *